Nov. 11, 1969      G. W. E. ROBERTSON ET AL      3,477,478
                   MATERIAL DISPENSING DEVICE
Filed Feb. 28, 1966                              6 Sheets-Sheet 3
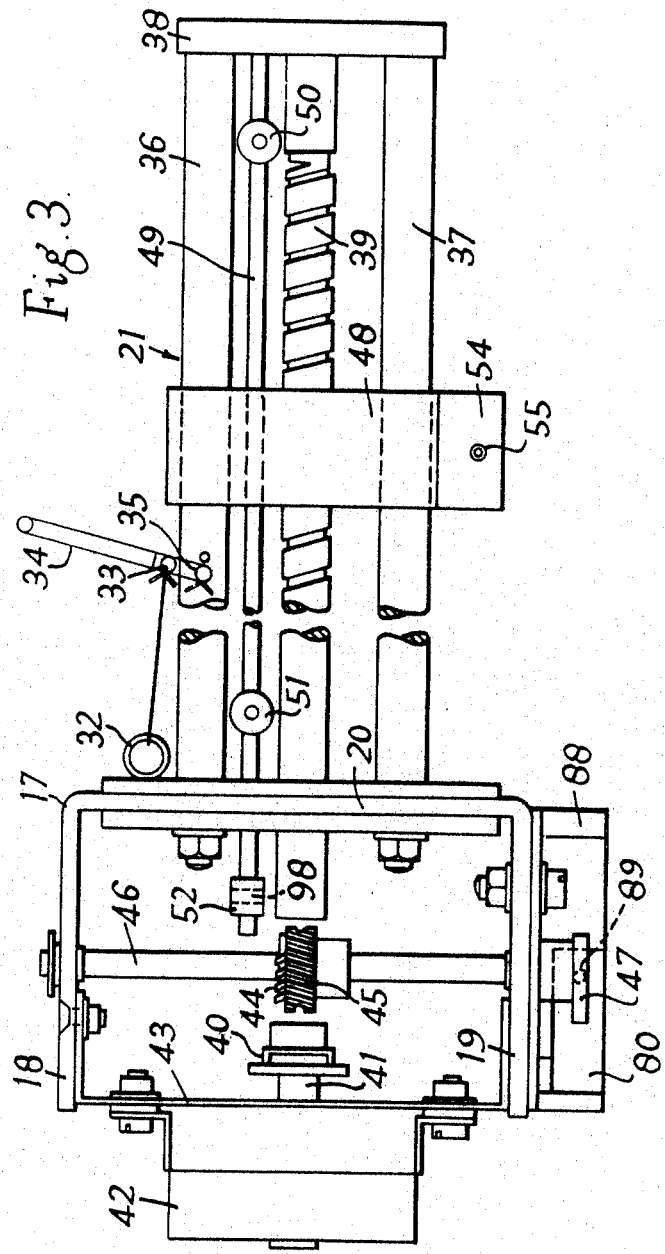
INVENTORS
Gavin W. E. Robertson &
Cyril W. C. Dyson
BY Karl W. Flocks
                ATTORNEY

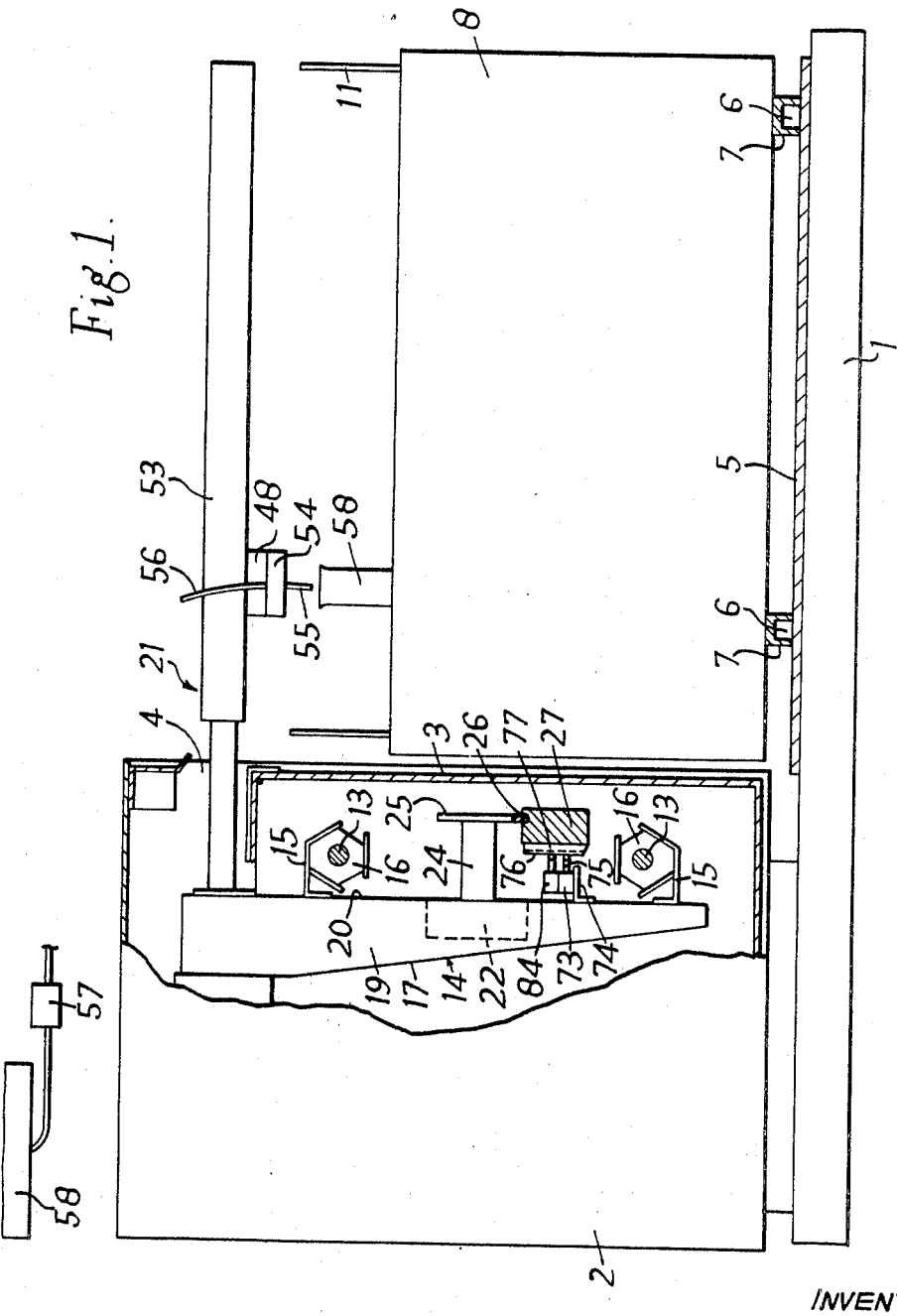

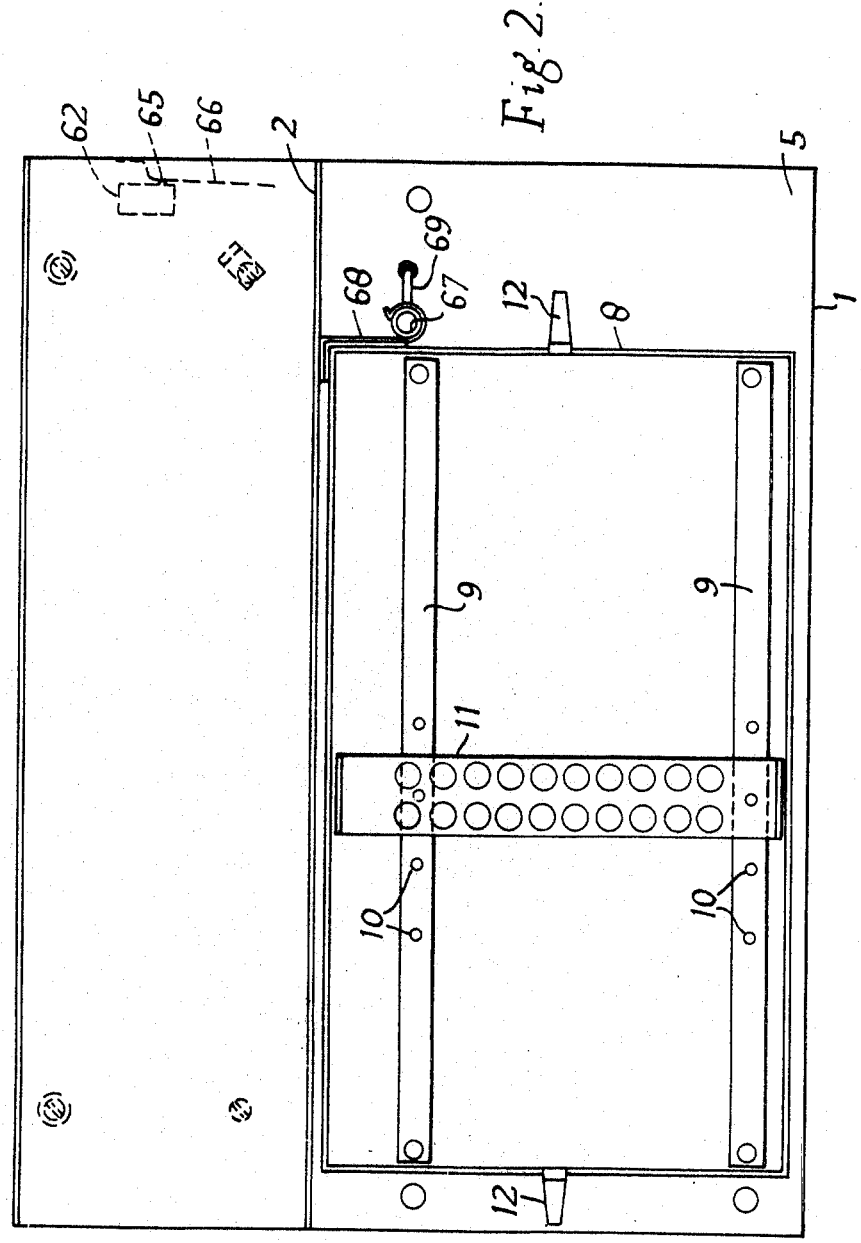

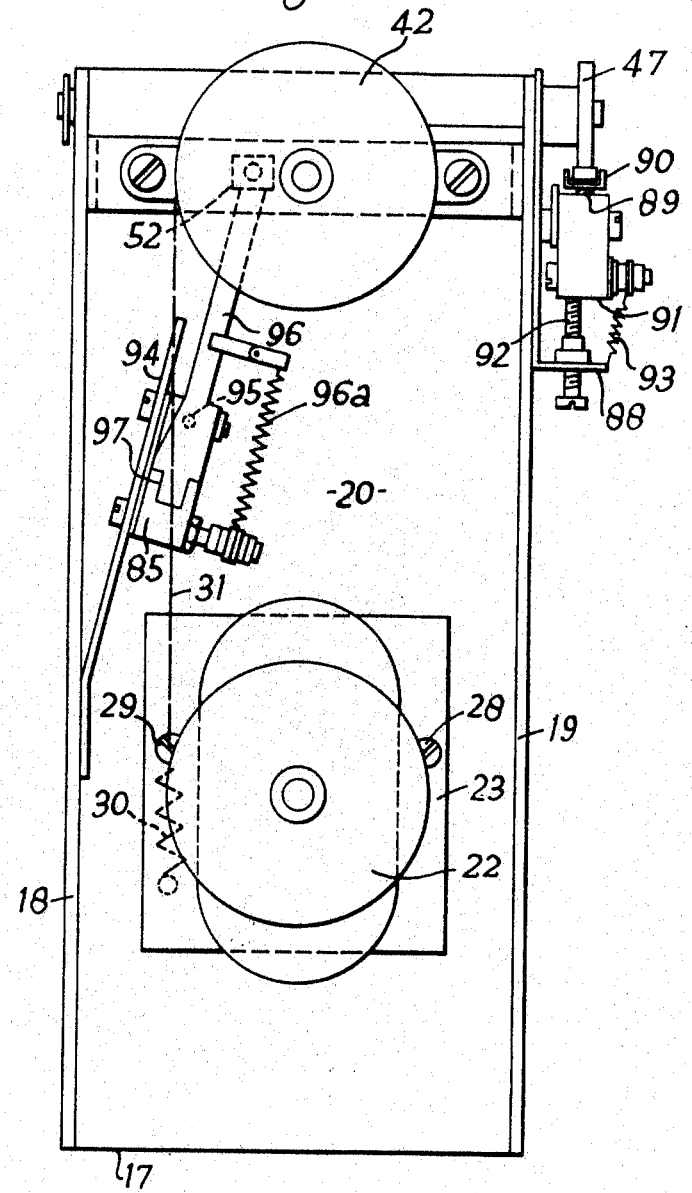

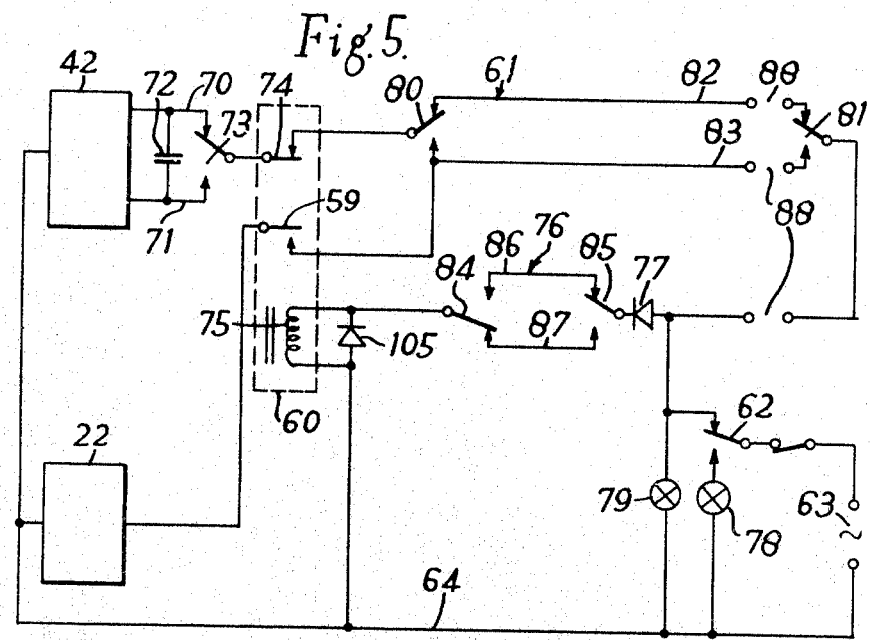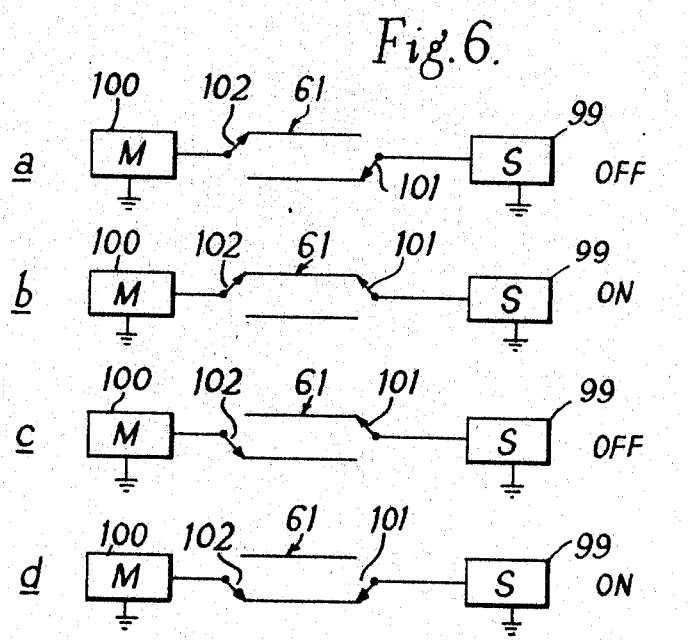

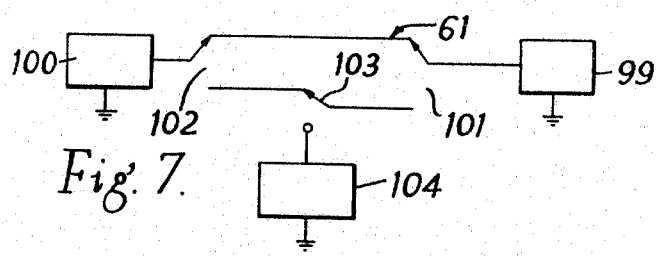
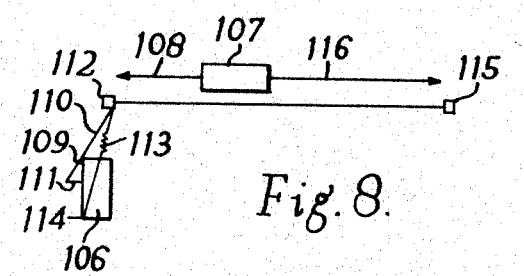
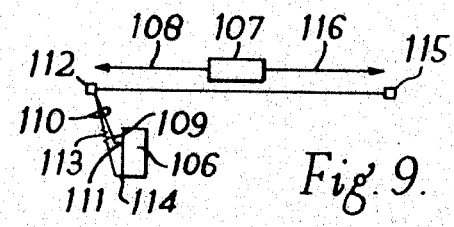
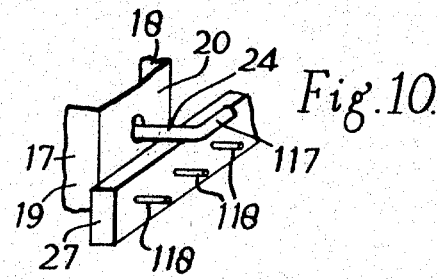
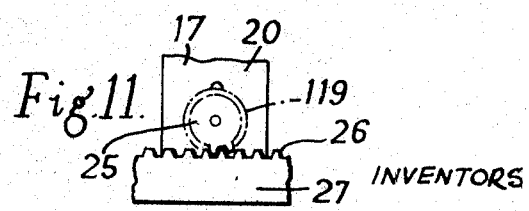
INVENTORS
Gavin W. E. Robertson &
Cyril W. C. Dyson
BY Karl W. Flocks
ATTORNEY United States Patent Office 3,477,478
Patented Nov. 11, 1969

3,477,478
MATERIAL DISPENSING DEVICE
Gavin W. E. Robertson and Cyril W. C. Dyson, London, England, assignors to Baird and Tatlock (London) Limited, Chadwell Heath, England, a company of Great Britain
Filed Feb. 28, 1966, Ser. No. 530,597
Claims priority, application Great Britain, Feb. 26, 1965, 8,421/65
Int. Cl. B67c 3/26, 3/34; B65b 43/42
U.S. Cl. 141—284                              9 Claims

ABSTRACT OF THE DISCLOSURE

The invention concerns a material dispensing device comprising a dispenser mounted on a carriage above a plurality of material receiving locations arranged in rows as a rectangular array, a first reversible motor for moving the dispenser relative to the carriage parallel to the rows, a second motor for moving the carriage normal to the direction of the rows and control means for controlling operation of the motors so that the dispenser registers with each location in succession while travelling in opposite directions along adjacent rows.

---

This invention relates to a material dispensing device device capable of successively dispensing material at a plurality of locations and is particularly although not exclusively concerned with a fraction collector in which a fraction collecting vessel is disposed at each of the locations and the material is a liquid.

In the past many forms of fraction collector have been proposed and generally comprise a siphon-pipette dispenser, usually fed from a chromatographic column and an annular array of up to about one hundred test tubes which are moved successively into register with the siphon-pipette. Such apparatus tends to be bulky in relation to the number of test tubes it can accommodate and there is generally a practical limit of about one hundred test tubes.

It is therefore an object of the present invention to provide an improved material dispensing device which is particularly although not exclusively suitable for use as a fraction collector.

According to the present invention there is provided a material dispensing device comprising a dispenser disposed above a plurality of material receiving locations arranged in rows as a rectangular array and means for causing relative zig-zag movement between the dispenser and the array so that the former successively registers with each location in one row and then with each location in the next row. Preferably the array is fixedly supported upon a stationary base and the dispenser is linearly movable in two directions at right angles to one another.

Several embodiments of the invention will now be described by way of example with reference to the accompanying drawings in which:

FIG. 1 is an end elevation of a fraction collector with parts cut away and other parts omitted for clarity, FIG. 2 is a plan view of the fraction collector of FIG. 1 with the arm omitted, FIG. 3 is a plan view to a larger scale of the arm and its operating mechanism, FIG. 4 is an end elevational view of the structure of FIG. 3, FIG. 5 is a diagram of a control circuit for the fraction collector, FIGS. 6 (a, b, c and d) shows different conditions of part of the circuit of FIG. 5, FIG. 7 is a variation of the arrangement of FIG. 6, FIGS. 8 and 9 show two conditions of a microswitch arrangement, FIG. 10 shows diagrammatically in perspective an alternative form of carriage moving mechanism and FIG. 11 diagrammatically in side elevation another form of carriage moving mechanism.

Referring to FIGS 1 to 4 of the drawings the fraction collector comprises a base 1 provided at its rear with a housing 2 the front wall 3 of which is formed with an opening 4 extending along most of the length thereof. The upper surface of the forward part of the base 1 constitutes a platform 5 having upwardly extending pins two of which are shown at 6 for accurately locating the hollow feet such as 7 of a rectangular cradle 8. As shown in FIG. 2 the base of the cradle 8 is provided internally with longitudinally extending bars 9 having upwardly extending spaced apart locating pins 10 for accurately locating transversely extending test tube racks such as 11. At each end the cradle 8 is provided with outwardly extending members 12 which may be used as handles for lifting the cradle and which may also be engaged by catch members (not shown) mounted on the base 1 to clamp the cradle firmly thereagainst.

A pair of rails 13 extend longitudinally of the housing 2 one above the other near the front wall 3 thereof and support a carriage indicated generally at 14 for movement therealong. Two sets of brackets such as 15 extend outwardly from the carriage respectively above and below the rails 13. Each bracket carries three rollers which are equi-angularly disposed to engage around the rails. This arrangement of rollers is shown diagrammatically at 16 in FIG. 1.

The carriage 14 comprises a vertically extending member 17 which is generally U-shape in plan as shown in FIG. 3 having opposed side walls 18 and 19 and a front wall 20 to which the brackets 15 are secured and an arm indicated generally at 21 extending forwardly from the upper part of the member 17 through the opening 4 and transversely above the platform 5 on the base 1 to be spaced therefrom a distance convenient for the reception of the cradle 8 and test tube racks 11.

A motor 22 mounted on a plate 23 on the rear face of the front wall 20 of the member 17 drives a shaft 24 carrying a gear wheel 25 which normally meshes with a rack 26 supported along the upper surface of a rectangular bar 27 extending longitudinally of the casing 2. The shaft 24 passes through an elongated slot (not shown) in the wall 20 and the motor plate 23 is pivotable about a screw fastener 28; a further screw fastener 29 being upwardly slidable in a slot (not shown) in the wall 20 but normally urged downwardly by a spring 30 to maintain the gear wheel 25 in engagement with the rack 26. A cord 31 has its lower end secured to the screw 29 and passes upwardly along the outer face of the wal 20 through an eye 32 (FIG. 3) and has its upper end secured at 33 to a lever 34 pivoted at 35 to the arm 21. It will be understood that pivotal movement of the lever 34 in a clockwise direction as viewed in FIG. 3 lifts the gear wheel 25 from the rack 26 to permit the carriage and arm structure to be freely slidable along the rails 13.

As shown in FIG. 3 the arm 21 comprises a pair of spaced parallel support rods 36 and 37 each having their inner ends secured to the front wall 20 of the member 17 and bridged at their outer ends by a bar 38. A lead screw 39 has its outer end supported in a bearing (not shown) in the bar 38 and extends between and parallel with the rods 36 and 37 through an aperture in the wall 20 and its inner end is joined by a coupling 40 to the shaft 41 of a motor 42 secured to a support 43 at the upper end of the member 17. As indicated diagrammaticaly in FIG. 3 the lead screw 39 carries a worm 44 which meshes with a helical gear 45 carried on a shaft 46 extending at right angles to the lead screw 39 and supported in bearings in the side walls 18 and 19 of the member 17. One end of the shaft extends outwardly of the side wall 19 and carries a cam 47 as will hereinafter be described.

A nut 48 is threaded on the lead screw 39 and slidably engages over the rods 36 and 37 so as to be movable longitudinally of the arm 21 upon rotation of the lead screw by the motor 42. A rod 49 extends alongside the lead screw 39 and is longitudinally movable in an aperture in the bar 38 and in a corresponding aperture in the wall 20. The rod carries movable stops 50 and 51 to be engaged by the nut 48 at each end of its travel along the lead screw to move the rod longitudinally in one or other direction. The inner end of the rod projects within the member 17 and carries a switch operating block 52.

As shown in FIG. 1 the arm 21 is encased in an open bottomed cover 53 so that the lower part of the nut 48 projects therebelow with a part 54 of the nut formed with an aperture 55 extending to one side of the arm.

The arm 21 carries a liquid dispenser comprising the lower end 55A of a flexible tube 56 supported in the part 54 of the nut 48. It will be assumed that the tube 56 is connected via a peristaltic pump 57 with a chromatographic column the position of which is indicated diagrammatically at 58 remote from the fraction collector. The motors 22 and 42 and the pump 57 are coupled together through a suitable control circuit with a variety of limit switches on the fraction collector to effect automatic operation thereof and to cause movement of the dispenser 55A relative to test tubes such as 58A in the racks such as 11 in a zig-zag formation with intermittent motion so that the dispenser registers in turn at the location of each test tube of one row travelling in one direction then with each test tube of the next row travelling in the opposite direction there being a dwell period during each such registration while the pump 57 is energised. In this specification the term "row of test tubes" will be taken to mean each line thereof parallel with the longitudinal direction of the arm 21; thus each rack 11 contains two rows of ten tubes.

A suitable circuit for controlling operation of the fraction collector is shown in FIG. 5 of the drawings.

Referring to FIG. 5 the motor 22 is energised via a contact 59 of a relay indicated generally at 60 a two-way circuit indicated generally at 61 and an on/off switch 62 by an alternating current supply 63 the neutral line 64 of which is connected directly to the motor 22. The switch 62 as shown in FIG. 2 of the drawings is mounted within the casing 2 and its button 65 is operable by an arm 66 engageable by the member 17 at one end position of its travel along the rails 13. In this end position the arm 21 overlies that part of the platform 5 beyond the end of the cradle 8 to permit the latter to be removed and replaced and with the nut 48 at the innermost end of the lead screw 39 the dispenser 55 is immediately above an exhaust funnel 67 carried by a bracket 68 secured to the front wall 3 of the housing 2 and connected via a pipe 69 with a suitable exhaust chamber (not shown).

The motor 42 as shown in FIG. 5 is connected to the line 64 and also the lines 70 and 71 bridged by a capacitor 72 to the fixed contacts of a changeover reversing switch 73 mounted as shown in FIG. 1 on a bracket 74 carried by the front wall 20 of the member 17. The operating button of the switch 73 is controlled by an arm 75 carrying a roller at its outer end to engage the surfaces of a series of cam plates such as 76 mounted on the bar 27. The outer surfaces of the cam plates are inclined as indicated by the dotted line 77 in FIG. 1. The moving contact of the switch 73 is connected via a contact 74 of the relay 60 with the two way circuit 61 the switch 62 and the alternating current supply 63.

The relay 60 has an energising coil 75 one end of which is connected to the line 64 and the other end of which is connected through a two way circuit 76A, a half wave rectifier 77A and the switch 62 with the alternating current supply 63. The switch 62 is a single pole changeover switch its fixed contacts being respectively connected to an "off" indicator lamp 78 and an "on" indicator lamp 79.

The two way circuits 61 and 76A respectively comprise single pole changeover switches 80 and 81 the fixed contacts of which are joined over lines 82 and 83 and single pole changeover switches 84 and 85 the fixed contacts of which are joined over lines 86 and 87. As shown the switch 81 is physically separate from the remainder of the circuit and is indicated as being joined thereto by plug contacts 88. The switch 81 may be controlled by timing apparatus (not shown) or by the peristaltic pump 57 to control energisation of the motor 42.

The switch 80 is mounted on a carrier 88A which is pivotally mounted on the side wall 19 of the member 17 as shown in FIGS. 3 and 4 of the drawings the operating button 89 of the switch being engageable by the cam 47 through the intermediary of a cam follower lever 90 shown only in FIG. 4. The switch is itself pivotally mounted and its lower surface 91 is urged against a screw stop 92 by a spring 93. The cam 47 has its peripheral surface cut to two different radii so that the switch is operated upon each half rotation of the shaft 46 the ratio of the worm and wheel 44 and 45 being such in relation to the pitch of the thread on the lead screw 39 that the switch 80 is operated each time the nut moves from one dispensing location to the next along a row. Pivotal movement of the carrier 88A and the switch 80 serves respectively to provide coarse and fine adjustment of the switch operating point.

The switch 84 is mounted as shown in FIG. 1 of the drawings with the switch 73 and is similarly operable by the cam plates 76 although the cam followers engaging these cam plates are so displaced that the switch 73 always operates before the switch 84 in order to take into account manufacturing tolerances in the switches and ensure that the carriage will not be brought to a stop before its direction of motion has been reversed.

The switch 85 is as shown in FIG. 4 of the drawings mounted on an inclined bracket 94 on the inner face 18 of the wall of the member 17 and its operating button 95 is operated by an arm 96 pivoted at 97 and engaging loosely in a slot 98 (FIG. 3) in the block 52.

The lever 96 is controlled by a spring 96A as will be described hereinafter. It will be understood that the switch 85 is operated by engagement of the nut 48 with one or other of the pre-set stops 50 and 51 mounted on the rod 49.

As shown in FIG. 6 of the drawings the use of a two-way circuit such as 61 (FIG. 1) between a supply indicated at 99 and a motor indicated at 100 provides an automatic re-setting arrangement assuming that the switch 101 is used to initiate energisation of the motor and the switch 102 is used to stop the motor for example at predetermined times. In the arrangement of FIGS. 6a and 6c the motor is de-energised whereas in either of the arrangements of FIGS. 6b and 6d the motor is energised. FIG. 7 shows a modification of this circuit in which one of the lines joining the switches 101 and 102 is itself coupled through a single pole changeover switch 103 with another piece of apparatus indicated at 104 so that additional switching operation can take place in preparation for the next "on" signal. Such an arrnagement constitutes a pre-selector mechanism.

In operation it will be assumed that the arm 21 is moved by hand to the appropriate starting position for a batch of tubes 58A so that the switch 62 is in the position shown in FIG. 5 of the drawings and it will also be assumed that the remaining switches of the circuit are as shown in FIG. 5 the switch 81 having been separately operated at its remote location to initiate energisation of the motor 42 via the switch 80 the relay contact 74 and the reversing switch 73. During travel of the dispenser 55A successively to register with each test tube 58A in a row the peristaltic pump 57 is operated intermittently to feed liquid from the chromatography column into each test tube. At the end of the row the nut 48 engages the stop 50 moves the rod 49 and causes the switch 85 to be operated while the switch 80 is not at this time operated. The switch 85 energises the relay coil 75 via the rectifier 77A and the two-way circuit 76A. Thus the coil 75 is energised by direct current which opens its contact 74 and closes its contact 59. Closure of the latter (and assuming operation of the switch 81 for example by the peristaltic pump) causes energisation of the motor 22 which moves the carriage until the dispenser 55A is opposite the next row of tubes 58 at which time the switch 84 is operated by an edge of an appropriate one of the cam plates 76 to de-energise the relay 60. As mentioned above the switch 73 will have been operated fractionally in advance of the switch 84 by the same cam plate edge to reverse the direction of rotation of the motor 42 so that subsequent energisation of this motor causes the dispenser 55 to return along the line of the second row of tubes 58. As shown in FIG. 5 a rectifier 105 is connected across the coil 75 in the reverse sense to the rectifier 77A to protect the coil and the contacts of the switches 84 and 85 against reverse L.M.F. from the coil. De-energisation of the relay 60 (and assuming its contacts 59 and 74 to be spring loaded towards the positions shown in FIG. 5) de-energises the motor 22 and causes the motor 42 to be energised over the lines 71 and 83 to run in the reverse direction and enable the dispenser 55A to traverse the next row of tubes 58A in the opposite direction.

It will be understood that the dispenser 55A will thereafter follow a zig-zag path along each row of tubes in turn until the end of the cradle 8 is reached when the switch 62 is operated to disconnect the alternating current supply 63. As mentioned above at this time the arm 21 is clear of the cradle 8 and the dispenser is above the funnel 67. While the switch 62 is in the position shown in FIG. 5 the "on" indicating light 79 will be energised and when the supply is disconnected the "off" indicating light 78 will be energised.

In the circuit of FIG. 5 those of the switches which are to be operated by selective movement between two elements may be bistable switches such as toggle switches but in order to achieve greater sensitivity in operation it is desirable to employ microswitches as shown in the drawings which are operable with an applied force as low as 30 grams. However commercially available microswitches are monostable and FIGS. 8 and 9 of the drawings show an arrangement whereby a conventional microswitch 106 is to be operated by a moving element 107 travelling first in the direction of the arrow 108. The operating button 109 of the microswitch is coupled to a lever 110 pivoted at 111 and having its end 112 to be contacted by the element 107 coupled by a spring 113 with a part 114 of the microswitch 106. It will be understood that as shown in FIG. 4 when the element 107 contacts the end 112 of the lever 110 the microswitch 106 is operated by the other end of the lever the latter travelling through a dead centre position to the position shown in FIG. 9. The end 112 of the lever 110 is also coupled to a member 115 at the opposite limit of travel of the element 107 in the direction of the arrow 106 so that when the element contacts the part 115 the microswitch is returned to the position shown in FIG. 8. This is the arrangement employed for operation of the switch 85 shown in FIG. 4 of the drawings but in this case the block 52 takes the place of both parts 112 and 115.

FIG. 10 shows another arrangement whereby the carriage 14 may be driven intermittently along the rails 13. In this arrangement the shaft 24 has its outer end 117 bent through 90° successively to engage a series of pegs 118 on the face of the bar 27. With such an arrangement it is to be expected that a reduction gear (not shown) would be interposed between the shaft 24 and motor 22. If desired the surface of the end 117 of the shaft 24 may be convex to provide good sliding engagement with the pegs 118.

Yet another arrangement is shown in FIG. 11 where the gear wheel 25 is only partially formed with teeth 119 for intermittent engagement with the teeth of the rack 26.

We claim:

1. A material dispensing device comprising a dispenser mounted on a carriage above a plurality of material receiving locations arranged in rows as a rectangular array, a first reversible motor for moving the dispenser relative to the carriage parallel to the rows, a second motor for moving the carriage normal to the direction of the rows, control means for controlling operation of the motors, the control means including a first two-way circuit comprising first and second series connected changeover switches connecting the first motor and a power supply, a remote timing apparatus for operating the second switch after each dispensing operation to start the first motor, contact means for operating the first switch each time the dispenser registers with a successive location along a row to stop the first motor, third switch means arranged to be enabled to disconnect the first switch from the first motor and connect it to the second motor, fourth switch means arranged to enable the third switch means each time the dispenser reaches a predetermined position at the end of a row, and fifth and sixth switch means respectively arranged to disable the third switch means and reverse the first motor each time the carriage registers with a successive row.

2. A material dispensing device according to claim 1 in which the first and second changeover switches are single pole switches each having two fixed contacts connected together the single movable contact of the first switch being connected through a normally closed contact of a relay forming the third switch means to the first motor and one of the fixed contacts of the first switch being connected through a normally open contact of the relay to the second motor.

3. A material dispensing device according to claim 2 in which the relay has a coil connected through a second two-way circuit comprising a pair of series connected changeover switches forming the fifth and fourth switch means respectively to the power supply.

4. A material dispensing device according to claim 3 in which the fifth switch means is arranged to operate shortly before the sixth switch means.

5. A material dispensing device according to claim 4 in which the changeover switches are bistable microswitches.

6. A device according to claim 4 in combination with a chromatographic column the output of which is supplied to the dispenser via a peristaltic pump and the second changeover switch is operated by the pump.

7. A material dispensive device according to claim 4 in which the carriage is mounted over a base on a pair of guide rails extending normal to the rows, the carriage supporting a lead screw extending parallel to the rows and arranged to be driven by the first motor, and the dispenser is carried on a nut on the lead screw and is prevented from rotation by a guide rod extending parallel to the lead screw.

8. A device according to claim 7 in which the contact means is operated by a cam driven by the lead screw.

9. A device according to claim 8 in which the second motor drives a gear wheel engaging with a rack fixed relative to the base in order to move the carriage along its guide rails.

References Cited

UNITED STATES PATENTS

| | | | |
|---|---|---|---|
| 3,168,124 | 2/1965 | Lenkey | 141—130 |
| 3,181,574 | 5/1965 | Lenkey et al. | 141—130 |
| 3,209,795 | 10/1965 | Page | 141—130 |

FOREIGN PATENTS 1,374,357  8/1964  France.

HOUSTON S. BELL, JR., Primary Examiner

U.S. Cl. X.R.

141—130; 23—259